United States Patent [19]
Hiramatsu

[11] Patent Number: 5,636,141
[45] Date of Patent: Jun. 3, 1997

[54] METHOD AND APPARTUS FOR ACCUMULATING AND SUPPLYING SIGNALS

[75] Inventor: Tamihei Hiramatsu, Kanagawa, Japan

[73] Assignee: Sony Corporation, Tokyo, Japan

[21] Appl. No.: 377,428

[22] Filed: Jan. 24, 1995

[30] Foreign Application Priority Data

Jan. 28, 1994 [JP] Japan .................... 6-008363

[51] Int. Cl.$^6$ ................................. H04N 5/907
[52] U.S. Cl. ............... 364/514 R; 395/250; 395/403; 395/872; 370/408; 360/32; 360/8
[58] Field of Search ................. 364/514 R; 370/61, 370/84, 118; 395/872, 250, 403; 360/32, 8

[56] References Cited

U.S. PATENT DOCUMENTS

| | | | |
|---|---|---|---|
| 4,716,472 | 12/1987 | McNally | 360/8 |
| 4,797,741 | 1/1989 | Sato et al. | 364/574 |
| 5,010,421 | 4/1991 | Arai | 360/32 |
| 5,197,063 | 3/1993 | Nakano et al. | 370/58.1 |
| 5,224,089 | 6/1993 | Matsumura et al. | 369/124 |
| 5,276,810 | 1/1994 | Kitamura et al. | 395/250 |
| 5,440,336 | 8/1995 | Buhro et al. | 348/13 |
| 5,481,543 | 1/1996 | Veltman | 370/94.1 |
| 5,515,368 | 5/1996 | Saito et al. | 370/61 |
| 5,519,435 | 5/1996 | Anderson | 348/8 |

*Primary Examiner*—Emanuel T. Voeltz
*Assistant Examiner*—Hien Vo
*Attorney, Agent, or Firm*—William S. Frommer; Alvin Sinderbrand

[57] ABSTRACT

An apparatus for accumulating and supplying the information includes a unit for encoding the information signals having an overall length of L seconds at a speed of V bits per second where $L>0$ and $V>0$, a memory unit for repeatedly reading out the entire region of the memory unit at a speed of $(N \times V)$ bits per second, a decoding unit for decoding the read-out information signals for recovering N information signal strings so that, during such decoding, each of the N information signal strings is separated from one another by a time phase equal to $L/N$, and a unit for selecting one of the N information signal strings so that the original information signals are supplied at the speed of V bits per second with the overall length of L seconds. In this manner, it becomes possible to cope with increase in the number of users and picture or speech signals of long time duration.

5 Claims, 6 Drawing Sheets

FIG.3A

| DATA BUS | | | | | | | | | | | | | | |
|---|---|---|---|---|---|---|---|---|---|---|---|---|---|---|
| Py 00 00 | Py 00 01 | Py 00 02 | Py 00 03 | ... | Py 20 47 | Py 00 00 | Py 00 01 | Py 00 02 | Py 00 03 | ... | Py 20 47 | Py 00 00 | Py 00 01 | Py 00 02 | Py 00 03 | ... | Py 20 47 |
| 0000 0000 | 0000 0000 | 0000 0000 | 0000 0000 | | 0000 0000 | 0000 0001 | 0000 0001 | 0000 0001 | 0000 0001 | | 0000 0001 | 3276 7 | 3276 7 | 3276 7 | 3276 7 | | 3276 7 |

| TIMING SIGNAL BUS | | | | | | | | | | |
|---|---|---|---|---|---|---|---|---|---|---|
| ADI7 | 0000 | 0001 | 0002 | 0003 | ... | 2047 | 0000 | 0001 | 0002 | 0003 | ... | 2047 | 0000 | 0001 | 0002 | 0003 | ... | 2047 |
| ADI8 | 00000 | | | | | | 00001 | | | | | | 32767 |

← 106.5 μs →

← 3.5s →

METHOD AND APPARTUS FOR ACCUMULATING AND SUPPLYING SIGNALS

BACKGROUND OF THE INVENTION

This invention relates to a method and apparatus for accumulating information signals for pictures or speech and for supplying the accumulated signals to plural terminals.

Among the signal accumulation and supplying apparatus for picture or speech signals to plural user terminals, there are a television broadcast apparatus and a broadcast apparatus exploiting a cable television (CATV) system.

These systems unidirectionally transmit multi-channel picture and speech signals to terminal devices, and the terminal devices only select a desired one of the multiple channels, while is has not been possible for the terminal devices to request the signal accumulation and supplying apparatus to transmit picture signals desired to be viewed.

Cassette auto-changers, for example, include means for transmitting the information for selecting the picture and speech signals from the terminal devices. However, in order for the cassette auto-changers to comply with requests made by the terminal devices, a number of transmitting devices corresponding to the number of the terminal devices is required, thus increasing the size of the cassette auto-changer and presenting problems in connection with cost, power consumption, mounting space and operational reliability.

Thus there has been proposed a multiple accessing technique of transmitting real-time signals, such as picture and speech signal, to plural users with the aid of IC memories which are semiconductor memories.

As for the multiple accessing technique of transmitting speech and picture signals to plural users with the aid of IC memories, there have so far been proposed the following two methods.

One of the methods resides in time-divisionally according the rights to use the memory to each user, while the other resides in providing each user side with a decoder.

In JP Patent Publication A-5-167544 (1993), there is disclosed an information distribution apparatus for transmitting the information having the contents responsive to plural terminals to the plural terminals comprising a memory for storing the information at locations specified by address signals, address generating means for sequentially generating plural address signals having values corresponding to the requests made by the plural terminal devices and information readout means for reading out information from the memory and supplying the read-out information to the plural terminal devices.

This belongs to the technique of time-divisionally according the rights to use the memory to each user. That is, a number of memory registers corresponding to the number of users are provided in the memory, and the users occupy their own address registers within the time allocated to them in order to freely access the memory. However, since the speed required of the memory is increased with increase in the number of users, there is imposed a limitation on the number of users.

In JP Patent Publication A-59-224897 (1984), there is disclosed a speech signal transmitting device in which the music source stored in a memory is sequentially read as sequentially time-shifted time-multiplexed multi-channel signals so that plural receivers are able to independently hear desired portions of the speech by unidirectional communication from the signal supply side to the signal receivers.

This belongs to the technique of providing each user side with a decoder, that is, a technique of transmitting the totality of high-speed playback signals to the users. Since the transmission channel of a broad frequency range is required, the technique can hardly be used for coping with picture or speech signals of prolonged play time such as those recorded on video discs or video tapes.

In view of the foregoing, it is an object of the present invention to provide a method and an apparatus capable of accommodating an increased number of users and coping with picture and speech signals of longer play time.

SUMMARY OF THE INVENTION

In one aspect, the present invention provides a method for accumulating and storing signals comprising encoding information signals having an overall play time of L seconds at a speed of V bits per second, storing the encoded information signal in a memory, repeatedly reading the entire region of the memory during reproduction at a speed of (N×V) bits per second, decoding the read-out information signals for recovering N information signal strings, separating each of the N information signal strings from one another by a time phase equal to L/N during such decoding, and selecting one of the N information signal strings so that the original information signals are supplied at the speed of V bits per second with the overall length of L seconds.

In another aspect, the present invention provides an apparatus for accumulating and supplying the information comprising means for encoding the information signals having an overall play time of L seconds at a speed of V bits per second, memory means for repeatedly reading out the entire region of the memory means at a speed of (N×V) bits per second, means for decoding the read-out information signals for recovering N information signal strings so that, during such decoding, each of the N information signal strings is separated from one another by a time phase equal to L/N, and means for selecting one of the N information signal strings so that the original information signals are supplied at the speed of V bits per second with the overall length of L seconds.

The signal accumulating and supplying apparatus may comprise a plurality of selection means to which a plurality of terminals are connected so that selection of the terminals is made at each selection means.

A non-volatile memory may be employed as the memory means and arranged within a dismountable cassette.

Signal writing may be made with skipping of a pre-set number of addresses with readout in the address sequence. Alternatively, signal readout may be made with skipping of a pro-set number of addresses with writing in the address sequence.

With the method and apparatus of the present invention, since the encoded information signals having an overall play time of L seconds and a speed of V bits per second are stored in a memory, the entire region of which is repeatedly read during reproduction at a speed of (N×V) bits per second and decoded for recovering N information signal strings and, during such decoding, each of the N information signal strings is separated from one another by a time phase equal to L/N, the time distance of the N information signals is L/N and hence an arbitrary position of the length L can be accessed by waiting for L/N second. By selecting one of the N information signal strings, it becomes possible to supply the original information signals with the play time of L seconds at a speed of V bits/second. Thus it becomes possible to cope with increase in the number of users as well as picture and speech information continuing for a prolonged time.

With the signal accumulating and supplying apparatus of the present invention, plural selection means are provided, to each of which plural terminals are connected so as to be selected by the selection means for coping with basically an infinite number of terminals. That is, by providing a number of selection means equal to the number of receivers, the information signals can be supplied to basically an infinite number of receivers.

By employing a non-volatile memory as memory means and by arranging it in a dismountable cassette, it may be exchanged freely for new ones. By exchanging the cassettes, it becomes possible to cope with basically an infinite number of channels.

Since signal writing may be made with skipping of a pre-set number of addresses with readout in the address sequence, or alternatively readout may be made with skipping of a pre-set number of addresses with writing in the address sequence, the same array in the read-out information signal string may be maintained with any of these alternative writing and readout methods.

BRIEF DESCRIPTION OF THE DRAWINGS

FIGS. 3A and 3B illustrate the relation between the signals on a data bus and on a timing signal bus.

DETAILED DESCRIPTION OF PREFERRED EMBODIMENTS

Figure 1:
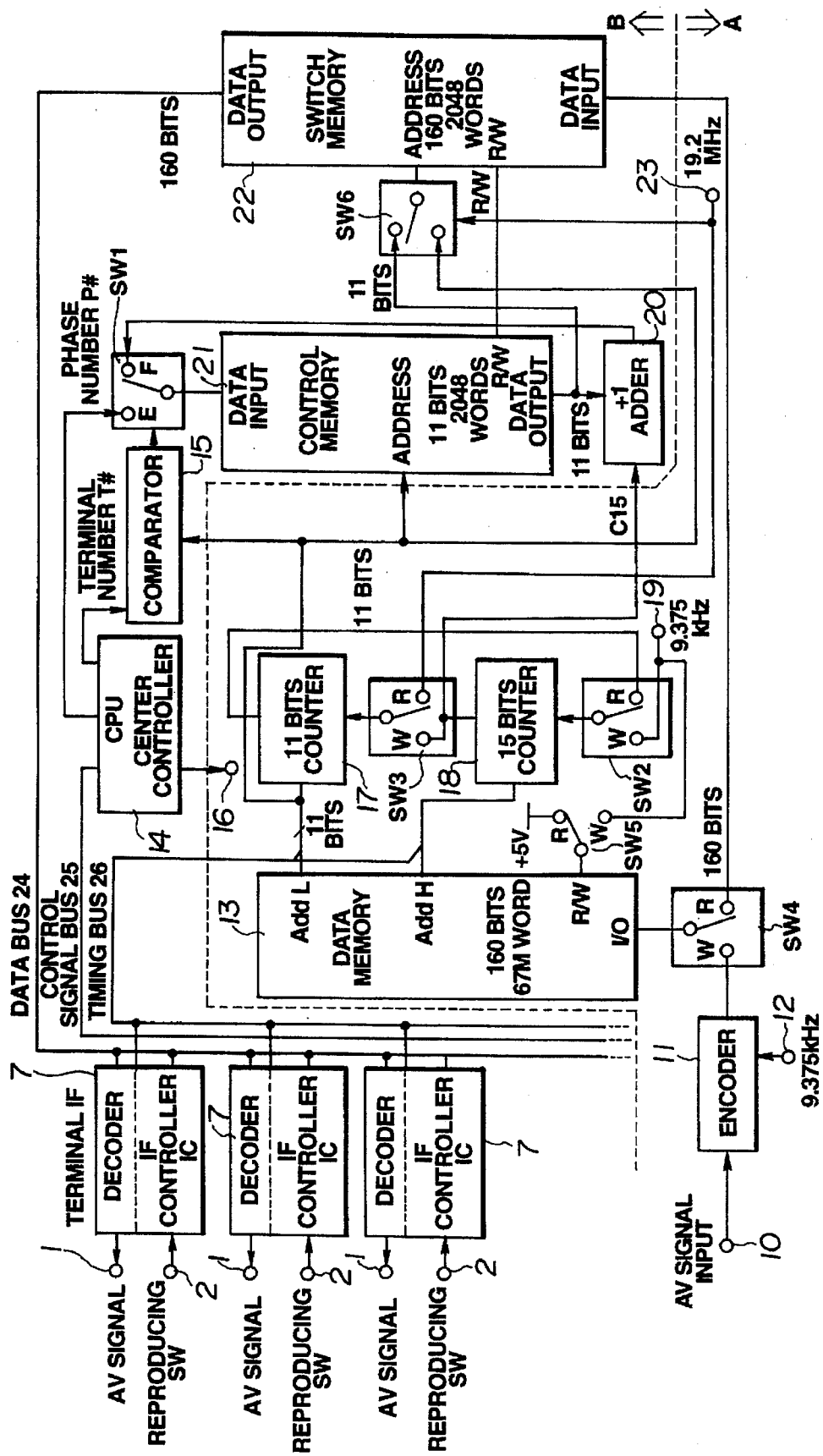
FIG. 1 is a schematic block circuit diagram showing a signal accumulating and supplying apparatus embodying the present invention.

Referring to the drawings, preferred embodiments of the present invention will be explained in detail.

In FIG. 1, there is shown an arrangement of a signal accumulating and transmitting device for carrying out the method of the present invention.

The present embodiment is directed to a signal accumulating and supplying device for compression-encoding the picture and speech information of a 2-hour motion picture to 1.6 Mbits per second (Mbps), with the aid of an encoding system known as a MPEG (Moving Picture Expert Group) 1 as a standard system for a picture compression encoding system, and storing the compression-encoded signals in a semiconductor memory having the storage capacity of 64 Mbits, with the entire memory area being random-accessed and reproduced from 2048 terminals with the maximum waiting time of 3.52 seconds. If, with the present signal accumulating and transmitting device, the number of terminals is to be increased, simply the distribution centers for the terminals as later explained are increased in number without increasing the capacity of the memory having the encoded data stored therein.

The components of the signal accumulating and transmitting device shown in FIG. 1 will be explained sequentially.

An encoder 11 is a compression-encoder for compression-encoding the picture and speech signals supplied as a source via a terminal 10 to 1.5 Mbps in accordance with the MPEG1 system. Such compression-encoding is carried out herein with respect to a word string with each word being equal to 160 bits and 9.375 kHz (106.7 microsecond).

Figures 2A, 2B:
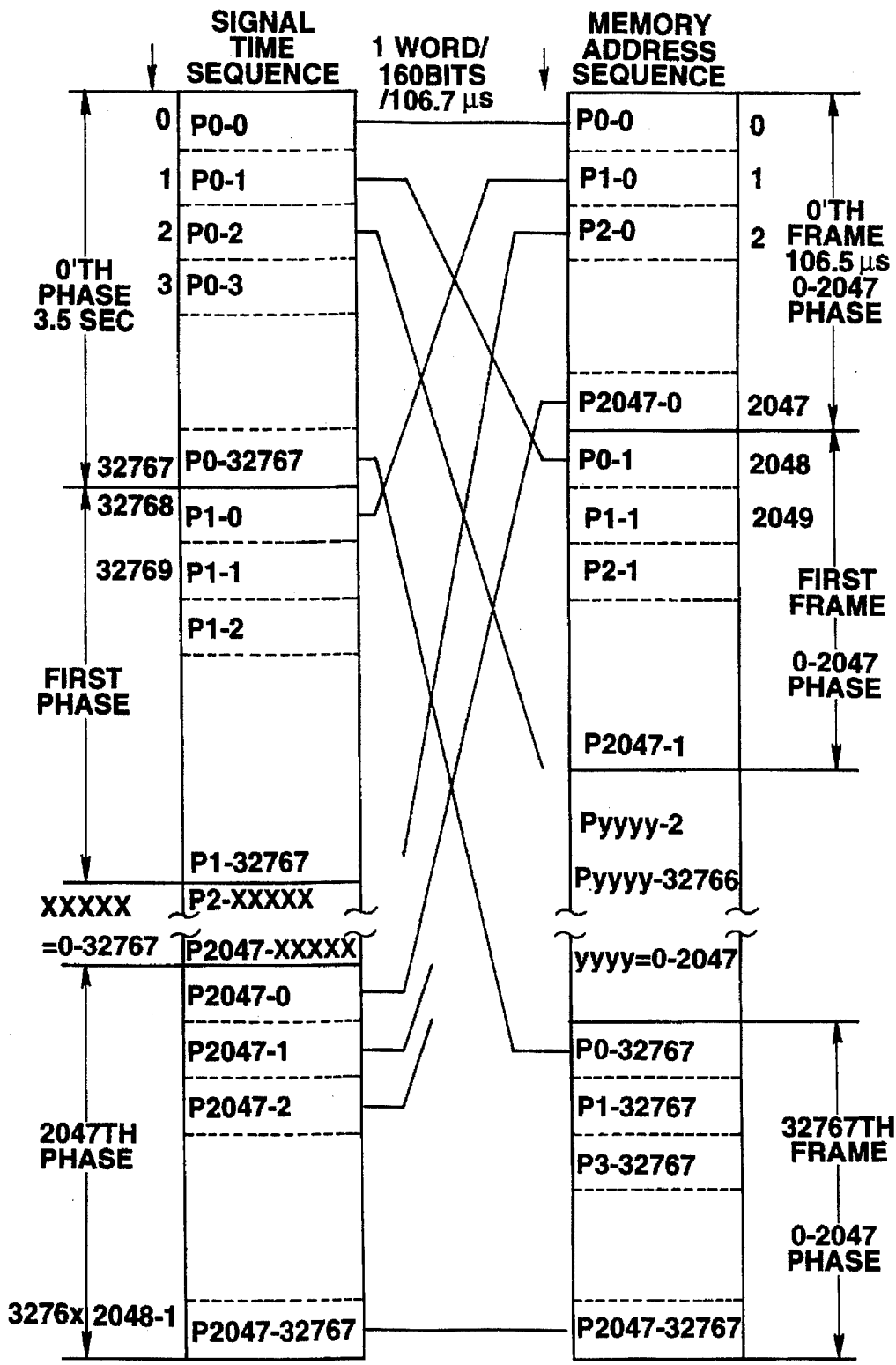
FIGS. 2A and 2B illustrate the relation between the signal time sequence and the array of the information on a data memory.

A data memory 13 is a memory for storage of source data encoded by the encoder 11 and supplied via a switch SW4. The data memory 13 has 160 1-bit×64 Mword chips in parallel and is continuously and repeatedly accessed at a cycle time of 52 nanoseconds. FIG. 2a shows a data String encoded by the encoder 11. Each data string is made up of 2048 phase data of from 0th phase to the 2047th phase, with each phase being 32678-word data continuing 3.6 seconds. The data string shown in FIG. 2a is stored in the data memory 13 as shown in FIG. 2b. That is, the data in the data memory 13 is data of 32768 frames of from the 0th frame to the 32767th frame. The data in the data memory 13 is 32678-frame data of from the 0th frame to the 32767th frame. The 0th word data from each phase, the first word data from each phase and so forth up to the 32767th word data from each phase from the encoder 11 are stored in the 0th frame, first frame and so forth up to the 32767th frame, respectively.

The switch SW4 is a switch for changing over from data writing in the data memory 13 to data readout from the data memory 13 and vice versa. The switch SW4 is changed over to a fixed terminal W or to a fixed terminal R during data writing or data readout, respectively. The switch SW4 is changed over in this manner under control by a central controller 14 as will be explained subsequently.

A switch SW5 is in operation simultaneously with the switch SW4 for changing over the readout/write control signals to be supplied to R/W terminals of the data memory 13. The readout control signal and the write control signal are at +5 V and 0 V, respectively. During readout and during writing, the readout signal is fixed at +5 V, and 9.375 kHz clocks from a terminal 19 are supplied to the data memory 13, respectively. During writing, source data supplied from the encoder 11 are written in the data memory 13 at a low-level half period of the 9.375 kHz clock.

A data bus 24 is used for transmitting multiplexed picture and speech data to a plurality of terminals IF7 from a switch memory 22 as later explained. 2048-channel source data are transmitted over the data bus 24 in the order of the channel numbers at a 160 bit width. The source data, such as picture data and speech data, are partitioned at an interval of 52 nanoseconds per channel, and transmitted over the data bus 24 in the sequence of from the 0th channel to the 2047th channel. Each section of 52 nanoseconds is termed a time slot. At each terminal IF7, data allocated to itself is fetched.

That is, a 11-bit output of a counter 17, as a time slot address indicating the time slot on the data bus 24, a 15-bit output of a counter 18, as a frame address indicating the current frame number of the data on the data bus 24, and 19.2 MHz clocks from a terminal 23 are transmitted over a timing signal bus 26. Each terminal IF7 fetches its data from the data bus 24 using a time slot address and a frame address.

Over a control signal bus 25 are transmitted a playback request signal transmitted from each terminal IF7 to a central controller 14 as later explained and a playback start frame number transmitted from the central controller 14 to each terminal IF7.

Each terminal IF7, made up of a decoder for picture and speech signals and an interface controller IC, serves as an interface with respect to terminal devices to be connected to the apparatus via terminals 1 and 2.

Specifically, each terminal IF7 controls the data extraction timing based on the time slot address supplied over the timing bus 26, that is a terminal address or a frame address, and extracts one-channel data from multiplexed picture and speech data on the data bus 24. Each terminal IF7 then decodes the extracted data and outputs the decoded data to a terminal device.

In addition, each terminal IF7 is responsive to playback commands such as play, stop or direct addresses from the terminal devices to output a playback request signal over the control signal bus 25 to control playback start.

With the present signal accumulating and transmitting apparatus, up to a maximum 2048 terminal devices may be connected thereto by the terminals IF7.

The central controller 14 is responsive to the random access playback request from each terminal to perform control necessary to comply with the playback request for each circuit.

A counter 18 is a 15-bit counter for outputting upper 15 bits of an address of the data memory 13. Besides outputting the 15-bit output, the counter 18 outputs "1" as a carry output when the 15 bits are all "1".

A counter 17 is a 11-bit counter for outputting lower 11 bits of an address of the data memory 13. The values of 0 to 2047 of 11 bits act as addresses for the control memory 21.

There are also provided switches SW2, SW3 which are each connected to a fixed terminal W and to a fixed terminal R for data writing and data readout, respectively. That is, the clock signals supplied to the fixed terminals W and R are selected in a commuting manner and transmitted to the counters 17 and 18 for modifying the operations performed by the counters 17 and 18. That is, during data writing, the switches SW2 and SW3 transmit 9.375 kHz clocks supplied from a terminal 19 to the counter 18 and thence to the counter 17. During such data writing, the count value of the counter 18 and the count value of the counter 17 are used as lower bits and as upper bits of the address of the data memory 13, respectively. Conversely, during data readout, the switches SW2 and SW3 transmit 19.2 MHz clocks supplied from a terminal 23 to the counter 17 and thence to the counter 18. During such data readout, the count value of the counter 17 and the count value of the counter 18 are used as lower bits and as upper bits of the address of the data memory 13, respectively.

A switch memory 22 transiently holds one-frame data from the data memory 13 and outputs data in a timed relation to the time slots at each terminal IF7. That is, the switch memory 22 is a 160-bit width 2048-word memory operating at intervals of 26 nanoseconds as a unit, and alternately receives its addresses from the counter 17 and the control memory 21. The switch memory 22 writes and reads data when supplied with the addresses from the counter 17 and from the control memory 21, respectively.

The control memory 21 generates and holds readout addresses for all of the terminals and is fed with the count values of the counter 17 as addresses and is fed with phase numbers P# from the central controller 14 as input data. These phase numbers P# are supplied to the terminals IF7. These addresses represent terminal numbers T#. In the control memory 21, the same data is repeatedly written during one address period in the region of the same address via a +1 adder 20 as later explained, such that the total stored contents are incremented by +1 only when the count value of the counter 18 is equal to 1, that is, only during the 32767th frame period. During data update, the phase number P# from the central controller 14 is written in the address region indicating the terminal number T# under control by the central controller 14.

The adder 20 performs an arithmetic operation of (output data of the control memory 21+output C15 of the counter 18). The result of the arithmetic operation is routed via a switch SW1 to the control memory 21.

The switch SW1 selects an output of the adder 20 or the phase number P# from the central controller 14 as a data input to the control memory 21. The switch SW1 is usually set to a fixed terminal F so that the output of the adder 20 is selected. If, however, the comparator 15 is operated under control by the central controller 14, that is when the contents of the control memory 21 are to be changed from the controller 14, the switch SW1 is set to the side of a fixed terminal E, such that the phase number P# from the central controller 14 is selected.

The comparator 15 compares the terminal number T# from the central controller 14 to a count value from the counter 17. The switch SW1 is set to the side of the fixed terminals E or F if the two are coincident with each other or otherwise, respectively.

The central controller 14 performs the control of storing source data, such as picture data or speech data, in the data memory 13, and the control of reading out optional potions of the picture and speech data stored responsive to the requests from each terminal IF7 from the data memory 13 and routing the read-out data to the terminal IF7. Picture and speech data are stored in the data memory 13 by setting the switches SW2, SW3 and SW4 to the sides of the fixed terminals W. Responsive to the random access request from each terminal IF7 and a request for playback from a portion having a number j of the i'th terminal (i=0 to 2047, j=0 to 32767×2047−1), the request from the i'th terminal is accepted and number j is converted into the phase number $P_j$, the phase number $P_j$ being then written in the address region having an address i of the control memory 21.

The practical operation of the signal accumulating device having the configuration shown in FIG. 1 is explained in sequence.

First, the operation of storing picture and speech data in the data memory 13 is explained.

The central controller 14 routes a changeover control signal via terminal 16 to the switches SW2, SW3 and SW4 for setting the switches to the sides of the fixed terminals W.

The encoder 11 is fed with 9.375 kHz output clocks via terminal 12. Based on these clocks, the encoder 11 compression-encodes the picture and speech signals at one-word 160 bits/106.7 microseconds (1.5 Mbps).

The resulting picture and speech signals are routed via the switch SW4 to the data memory 13.

The data string of the picture and speech data is a continuous data string in the time sequence shown in FIG. 2a. If the source has a length of 7160 seconds, as an example, the data string is composed of 67108864 (32768× 2048) words. The data string is divided at intervals of 32768-word blocks, each block being termed a phase. The entire words are made up of the 0'th phase words up to tue 2047th phase words, with each phase being 3.5 seconds long. Access requests from the terminal IF7 are made in the form of a certain hour certain minute certain second with respect to the entire time length of the source. Such access request herein is represented as a phase number y and a relative position x within the phase.

This data string is stored in an address sequence shown in FIG. 2b within the data memory 13 which is addressed by the counters 18, 17 operating at 9.375 kHz clocks (106.7 microsecond) supplied from the terminal 19.

Specifically, by the switches SW2 and SW3 being changed over to the fixed terminals W, the count value of the counter 18 and the count value of the counter 17 are routed to the data memory 13 as upper and lower address bits, respectively. That is, since the address in the data memory 13 is constituted by the count value of the counter 18 as the upper address bits and by the count value of the counter 17 as the lower address bits, the address in the data memory 13 has its lower 11 bits fixed and its upper 15 bits incremented, as a result of which the input data string is written with 2048 address skip (2"). Consequently, the picture and speech data are stored in the data memory 13 with an array as shown in FIG. 2b.

The outputting of the stored picture and speech data to the terminal IF7 is now explained.

The switches SW2, SW3 and SW4 are changed over to the sides of the fixed terminals R under control by the central controller 14. Thus the upper address bits and the lower address bits of the data memory 13 are the 15-bit count value from the counter 18 and the 11-bit count value from the counter 17, respectively. The counters 18, 17 are operated with 19.2 MHz clocks (52 nanoseconds) supplied via terminal 23, the data memory 13 repeatedly reading the data of the entire addresses from above towards below of FIG. 2b in 3.5 seconds, with the cycle time being 52 nanoseconds.

If the consecutive 2048 words on the data memory 13 are termed a frame, each frame represents the lower 11-bit addresses of the data memory 13, so that picture and speech are read on the frame basis from the data memory 13. The picture and speech data read out on the frame basis are routed to and held in the switch memory 22 where the lower 11-bit addresses of the data memory 13 directly represent the write addresses.

In each frame, data having the phase numbers of from 0 to 2047, that is one word of each block obtained on dividing the entire source data at an interval of 3.5 seconds are arrayed. Since the relative positions of from 0 to 2047 in each frame represent the addresses of the switch memory 22, each address of the switch memory 22 represents the phase number.

Consequently, source reproduction from a desired position is tantamount to converting the position on the source into the phase number and reading out data on the switch memory 22 using the phase number as the address.

Since the data stored in the switch memory 22 is sequentially updated on the frame basis, the original picture and speech data may be continuously produced by once determining the readout addresses of the switch memory 22 and by subsequently reading the same addresses in succession.

On the other hand, since the relative positions of from 0 to 32767 in an arbitrary phase correspond to the frame numbers, accessing to an arbitrary position in the entire source data, that is random accessing, may be achieved by awaiting until the frame number is coincident with the desired relative position after determining the phase by the above operation.

The following explanation is given by taking an example in which a request has been made from the terminal IF7 having the terminal number #560 for reproducing the source beginning at the 10-minute position.

The central controller 14 calculates the phase number indicating in which phase the 10-minute position is located, and the frame number. Since 10 minutes are equal to 600 seconds, so that 2048×600/7160=171.6, Thus the 10-minute position is within the 171st phase, in which it, is located at 0.6×32768=19660 relative position. Thus the phase number and the frame number are (phase number #0171 and frame number #19660, that is, P171-19660 in FIG. 2A–2B.

The central controller 14 then accords the terminal number #560 (00100101110 in 11-bit binary representation) to the comparator 15 and the phase number #171 (00010101011 in 11-bit binary representation) to the fixed terminal E of the switch SW1.

When the 11-bit count value of the counter 17 reaches 0560, the switch SW1 is changed over to the side of the fixed terminal E by an output of the comparator 15, and the phase number #171 is written at the address #560 of the control memory 21.

When next the count value of the counter 17 reaches 0560, the phase number #171 is read from the control memory 21 and becomes the readout address for the switch memory 22. Thus the 171st phase source data is outputted frame by frame at the time slot number #0560 of the data read out from the switch memory 22.

That is, the P0171-0 data, the P0171-1 data, the P0171-2 data, the P0171-3 data and so forth up to the P0171-35767 data are respectively outputted at the time slot number #560 of the 0'th frame, at the time slot number #560 of the first frame, at the time slot number #560 of the second frame, at the time slot number #560 of the third frame and so forth up to the time slot number #560 of the 32767th frame. This is tantamount to sequential reproduction within the 171st phase.

At the last time moment of the above operation, the entire 15 bits of the count output of the counter 18 become 1, such that the data of the address 1560 of the control memory 21 is incremented from 0171 to 0172. Thus the following operation occurs for the next cycle.

That is, the P0172-0 data, the P0171-1 data, the P0172-2 data, the P0172-3 data and so forth are respectively outputted at the time slot number #560 of the 0'th frame, at the time slot number #560 of the first frame and at the time slot number #560 of the second frame and so forth. This is tantamount to reproduction beginning from the start portion of the phase 172 with the phase having been incremented by +1.

On the other hand, since the reproduction start frame number is 19660, the central controller 14 transmits the frame number 19660 to the terminal IF7 having the terminal number 0560. the terminal IF7 is responsive thereto to compare the frame number to the current frame number on the timing bus 26 and causes the decoder to be in operation since a time point when the two frame numbers coincide with each other in order to output the picture and speech signals. This initiates reproduction at a time point corresponding to a 10-minute position from the beginning end of the source.

The above-described sequence of operations is repeated up to the last 2047 phase of the source.

The operation of halting the operation of reproducing the picture and speech source is now explained.

At the terminal device, it suffices to halt the display on a screen.

It is unnecessary for the central controller to transmit any signal at this time, so that the central controller is permitted to continue its playback operation.

When a request is made for an arbitrary reproduction, the operation explained in connection with the outputting to the terminal of the stored picture and speech source is executed.

FIGS. 3a and 3b show time slots on the data bus 24 and on the timing bus 26 in association with FIG. 2A and 2B.

FIGS. 3a and 3b show the time slots on the data bus 24 and the time slots on the timing bus 26, respectively. In FIG. 3a, Py denotes arbitrary phase numbers of from P0 to P2047. In FIG. 3b, AD 17 and AD18 denote time slot address numbers by the 11-bit output of the counter 17 and frame address numbers by the 15-bit output of the counter 18, respectively.

A modification of the present invention will now be explained.

Figure 4:
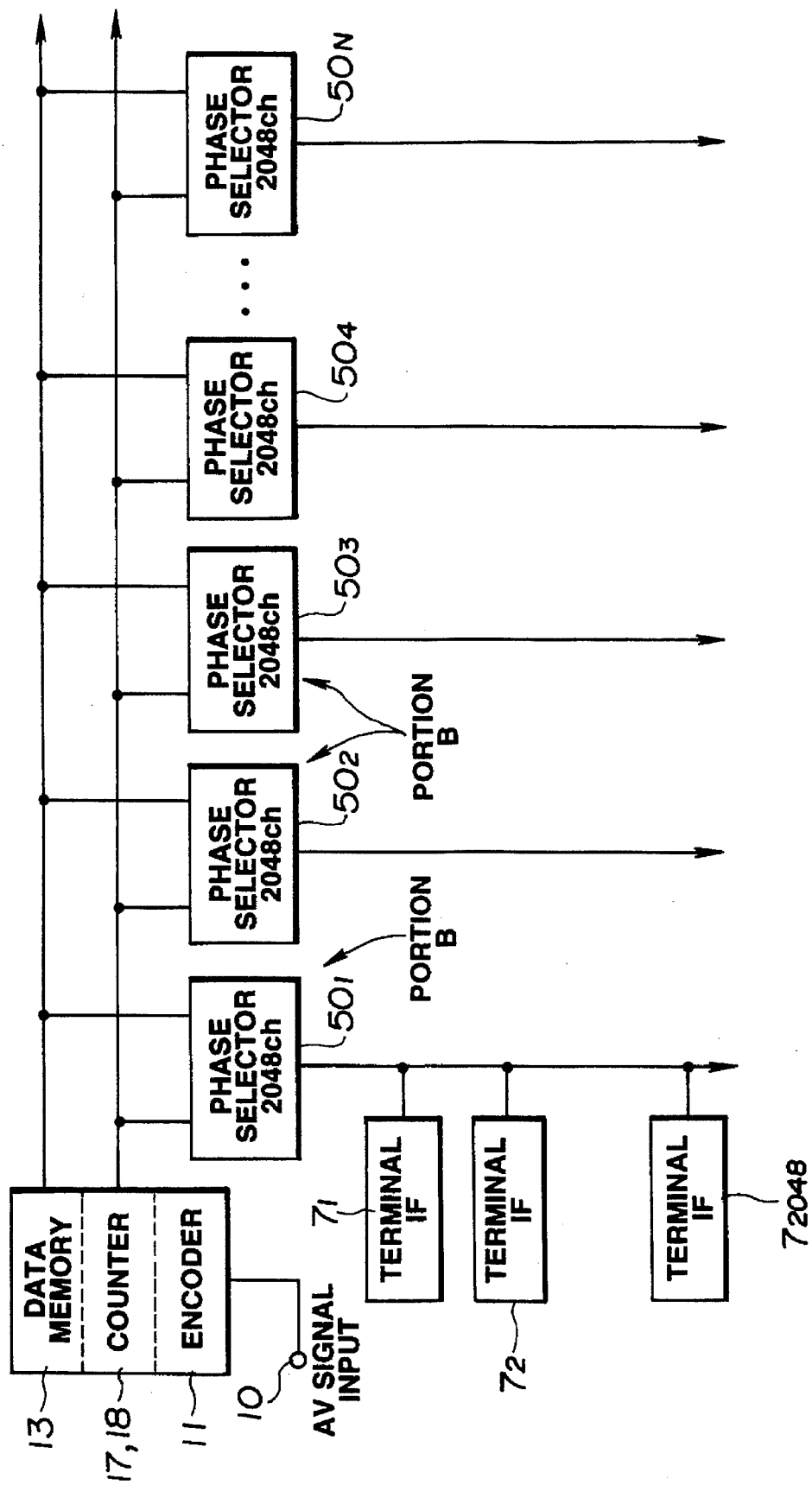
FIG. 4 is a block circuit diagram showing a practical arrangement for increasing the number of channels.

For increasing the number of channels, a portion A for storing picture and speech data, placed on one side of a broken line in FIG. 1, remains unchanged, that is, the speed and capacity of the apparatus are kept constant. However, with respect to a portion B on the other side of the broken line in FIG. 1, multi-phase selectors $50_1$ to $50_N$ for terminal devices are added as shown in FIG. 4 for coping with increase or decrease in the number of channels (terminal devices) with basically no limitations. That is, the multi-phase selectors $50_1$ to $50_N$ are connected to the data memory 13, counters 17, 18 and to the encoder 11. To the multi-phase selectors $50_1$ to $50_N$ are connected terminals $IF7_1$ to $IF7_{2048}$. In FIG. 4, parts and components corresponding to those shown in FIG. 1 are indicated by the same numerals and the corresponding description is not made.

Figure 5:
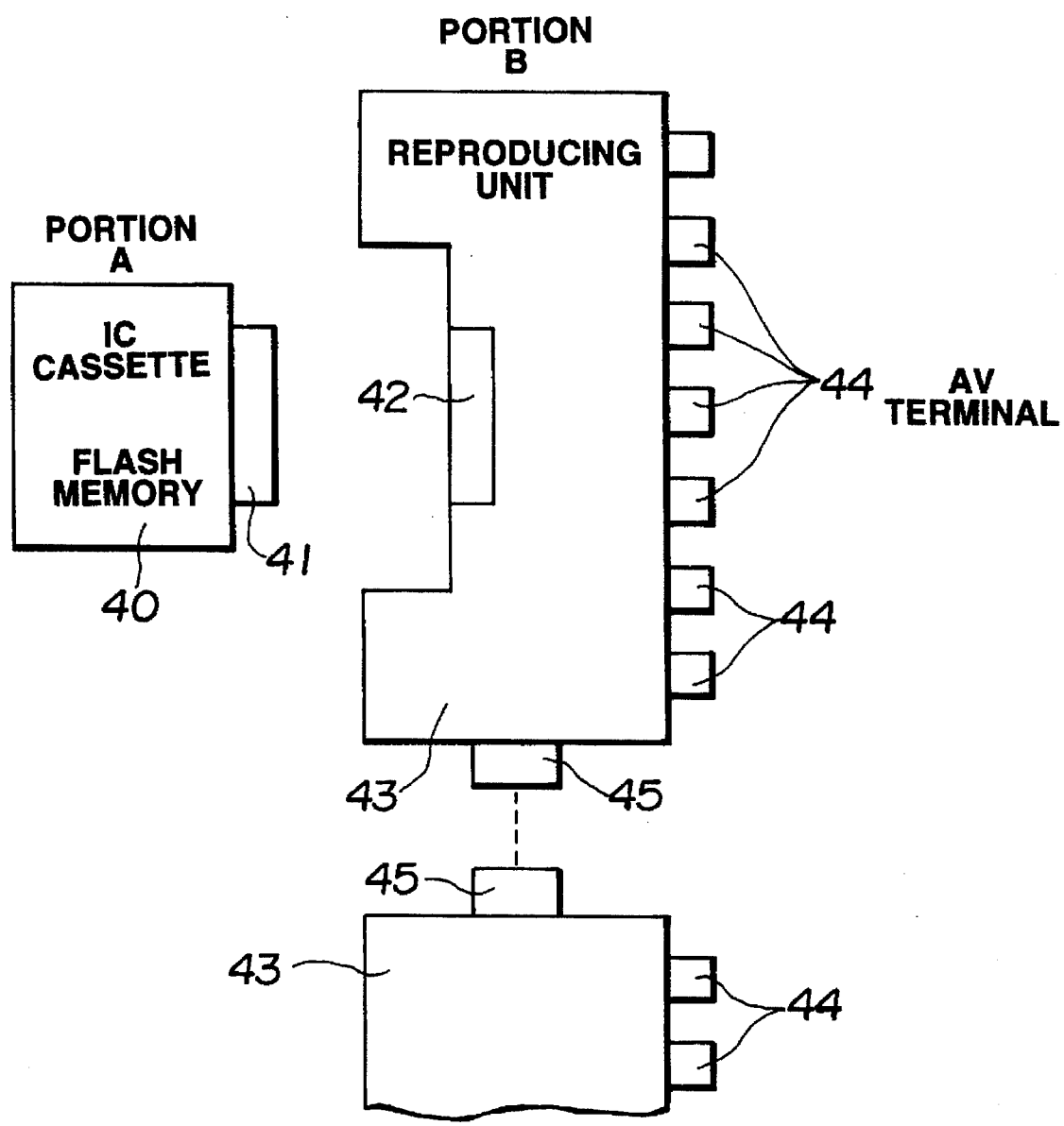
FIG. 5 illustrates a data memory in the form of a non-volatile memory designed as a cassette.

Referring to FIG. 5, only the data memory 13 corresponding to the portion A of FIG. 1 is designed as a non-volatile memory, such as a flash memory 40, which flash memory is designed as a dismountable IC cassette. In FIG. 5, a dismounting terminal 41 is provided on the flash memory 40 for connection to a mating dismounting terminal 42 of a reproducing unit 43 corresponding to the portion B in FIG. 1. A further connection terminal 45 for connection to another reproducing unit 43 is provided on the reproducing unit 43. In the embodiment of FIG. 5, the flash memory 40 may have the capacity comparable to the capacity of a conventional video cassette by employing 160 64-Mbit ICs. The system shown in FIG. 5 is of the same configuration as a video tape recorder with exchangeable tapes and thus becomes a video solid recorder with practically an infinite number of channels.

Figures 6A, 6B:
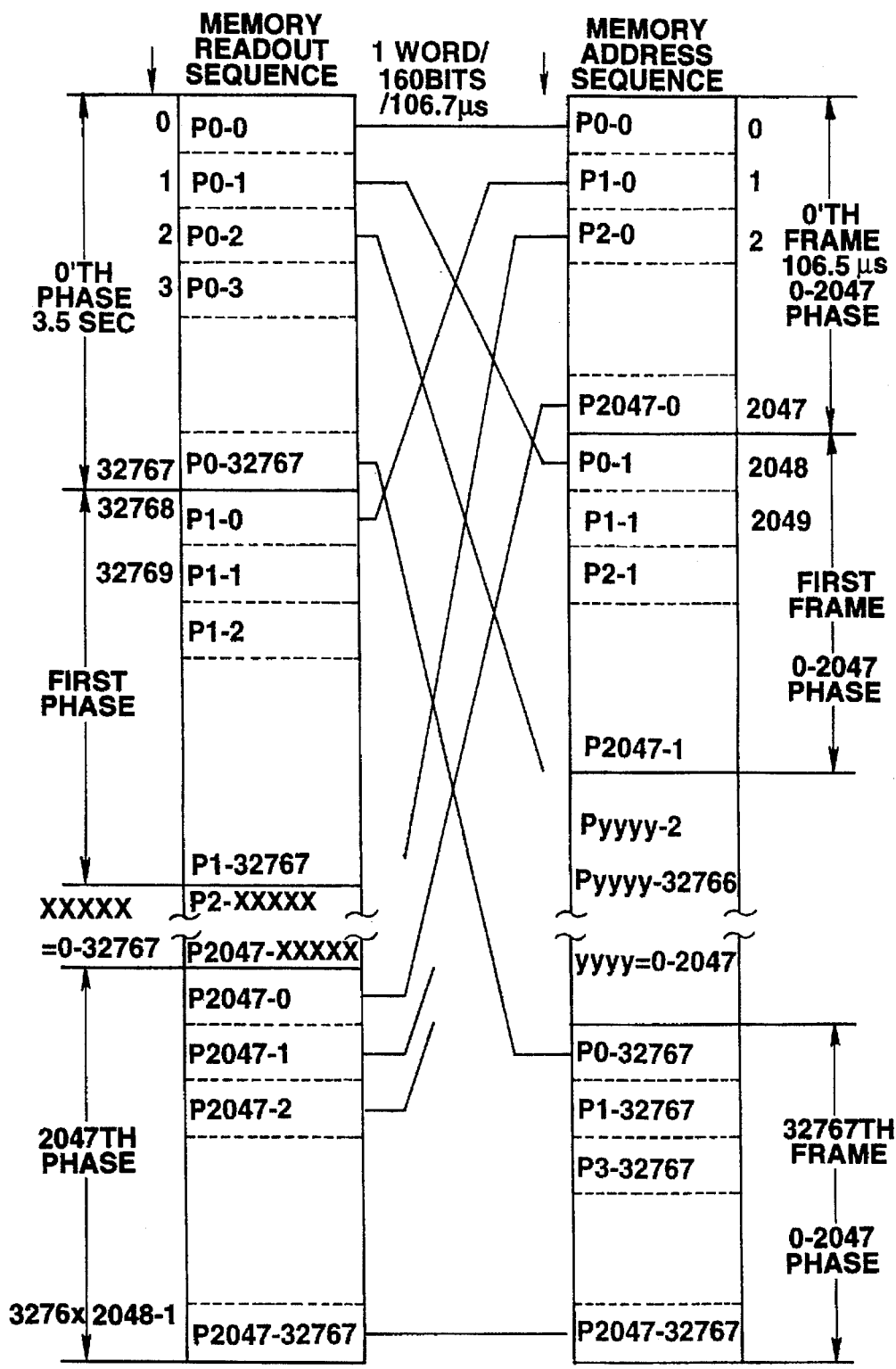
FIG. 6A and 6B illustrate another method of storing the information in a data memory.

Data storage in the data memory 13 may be achieved by a method shown in FIG. 6A and 6B, in which parts and components are the same as those shown in FIG. 2A and 2B. In the embodiment of FIG. 6A and 6B, straight addressing is made to the data memory 13 and skip addressing is made during readout. Of course, the effect derived from the straight writing and skip reading is the same as that achieved with the preceding embodiment.

With the above-described signal accumulation and supplying apparatus of he present invention, by storing digital picture and speech signals having a length L in an IC memory, repeatedly reading from the entire memory area at a rate equal to N times the usual rate and by decoding with temporal sub-sampling for restoration of the original signals, picture and speech signals may be reproduced by random accessing by practically an infinite number of terminals by annexing only the decoders with the memory speed remaining constant.

Thus it becomes possible with the present signal accumulating and supplying apparatus to permit an infinite number of users to random-access and utilize the picture and speech information. The memory accessing speed may remain constant without dependency on the number of users. The decoder/selector may easily be designed in a multiplex configuration, that is for use by tens of thousands of users.

In addition, with the present signal accumulating and supplying method and apparatus, since the high-speed signal processing may be completed within the transmitting apparatus, even picture signals may be handled without imposing load on the transmission channels.

Furthermore, since package media as many as the number of users, as required in the conventional practice, may now be eliminated, saving may be made in resources with favorable effects on the environment.

What is claimed is:

1. A method for accumulating and storing signals comprising encoding information signals having an overall length of L seconds at a speed of V bits per second, where L>0 and V>0, storing the encoded information signal in a memory, repeatedly reading the entire region of the memory during reproduction at a speed of (N×V) bits per second, where N>1, decoding the read-out information signals for recovering N information signal strings, during such decoding, separating each of the N information signal strings from one another by a time phase equal to L/N, selecting one of the N information signal strings so that the original information signals are supplied at the speed of V bits per second with the overall length of L seconds.

2. An apparatus for cumulating and supplying the information comprising means for encoding the information signals having an overall length of L seconds at a speed of V bits per second where L>0 and V>0, memory means for storing the information signals encoded by said encoding means, memory read-out means for repeatedly reading out the entire region of said memory means at a speed of (N×V) bits per second, means for decoding the read-out information signals for recovering N information signal strings so that, during such decoding, each of the N information signal strings is separated from one another by a time phase equal to L/N, and means for selecting one of the N information signal strings so that the original information signals are supplied at the speed of V bits per second with the overall length of L seconds.

3. The apparatus as claimed in claim 2 comprising a plurality of selection means to which a plurality of terminals are connected so that selection of the terminals is made at each selection means.

4. The apparatus as claimed in claim 2 wherein a non-volatile memory is employed as said memory means and is arranged within a dismountable cassette.

5. The apparatus as claimed in claim 2 wherein writing is performed with skipping of a pre-set number of addresses and readout is performed in the address sequence, or alternatively readout is performed with skipping of a pre-set number of addresses and writing is performed in the address sequence.

* * * * *